United States Patent [19]

Schultz

[11] 4,067,839

[45] Jan. 10, 1978

[54] HYDROPHILIC COPOLYMER OF N,N-($C_1$-$C_2$ ALKYL) ACRYLAMIDE

[75] Inventor: Herman S. Schultz, Lexington, Mass.

[73] Assignee: Itek Corporation, Lexington, Mass.

[21] Appl. No.: 429,455

[22] Filed: Dec. 28, 1973

Related U.S. Application Data

[63] Continuation-in-part of Ser. No. 347,954, April 4, 1973, abandoned.

[51] Int. Cl.$^2$ ............................................. C08L 33/26
[52] U.S. Cl. .................................. 260/29.6 TA; 264/1; 351/160; 526/303; 526/916
[58] Field of Search .................. 260/29.6 TA, 29.6 H, 260/80.73, 80.81; 264/1; 351/160 T

[56] References Cited

U.S. PATENT DOCUMENTS

| | | | |
|---|---|---|---|
| 3,499,862 | 3/1970 | Wichterle | 264/1 |
| 3,699,089 | 10/1972 | Wichterle | 260/80.73 X |
| 3,758,448 | 9/1973 | Stamberger | 260/29.6 TA X |
| 3,787,380 | 1/1974 | Stamberger | 260/29.6 TA X |
| 3,792,028 | 2/1974 | Seiderman | 260/29.6 WB X |
| 3,803,093 | 4/1974 | Neefe | 260/66 |

*Primary Examiner*—Lucille M. Phynes
*Attorney, Agent, or Firm*—Homer O. Blair; Robert L. Nathans; David E. Brook

[57] ABSTRACT

A hydrophilic copolymer of N,N-($C_1$-$C_2$ alkyl) acrylamide is disclosed. The copolymer is formed by reacting, based on 100 parts, from 20–80 parts of the $C_1$–$C_2$ alkyl substituted acrylamide, 80–20 parts of $C_1$–$C_4$ alkyl acrylates, methacrylates, or combinations, and small amounts of a cross-linking agent. The resulting copolymerization product can be equilibrated with water or other aqueous solutions to form hydrogels useful in forming shaped hydrogel articles. One particular shaped article which can be formed is a hydrophilic contact lens. A process for forming the hydrogels is also disclosed.

31 Claims, No Drawings

HYDROPHILIC COPOLYMER OF N,N-($C_1$-$C_2$ ALKYL) ACRYLAMIDE

CROSS REFERENCE TO RELATED APPLICATIONS

This is a continuation-in-part application of Ser. No. 347,954, filed Apr. 4, 1973 now abandoned.

BACKGROUND OF THE INVENTION

1. Field of the Invention

This invention relates to the formation of a hydrophilic copolymer useful in the formation of hydrogel contact lenses and other products.

2. Description of the Prior Art

Recently there has been a great deal of effort devoted to finding new materials which would be more suitable for contact lenses than the polymethyl methacrylate customarily used.

One avenue of approach has been to search for softer and/or more flexible materials, and some of these newer type materials which are described in the patent literature include: silicone rubbers such as those described in McVannel et al., U.S. Pat. No. 3,350,216; poly(4-methyl pentene-1) which is described in Kamath, U.S. Pat. Nos. 3,551,035 and 3,619,044; and fluoropolymers such as those described in Girard, U.S. Pat. No. 3,542,461.

Another avenue of approach has been to search for materials which would have better compatibility with eye fluids. Thus, some researchers have made attempts to treat the surfaces of naturally hydrophobic materials to render them hydrophilic. Others have formed copolymers including at least one monomer which is hydrophilic or which can be treated to make it hydrophilic.

To date, the most widely accepted of the new, hydrophilic, softer contact lens materials are hydrogels formed from aqueous solutions gelled with sparingly cross-linked acrylic polymers. Wichterle et al., U.S. Pat. No. Re. 27,401, describe in general one class of these hydrogels which can be formed from 20 to 97% of an aqueous liquid gelled with a sparingly cross-linked copolymer formed from a major amount of a hydrophilic monoester of acrylic or methacrylic acid cross-linked with a minor amount of a diester of these acids. The commercial soft contact lenses of the Wichterle type appear to contain a polymer network formed from large amounts of hydroxyethyl methacrylate cross-linked with small percentages of glycol dimethacrylate.

Other hydrogels presently described in the patent literature contain certain acrylic monomers together with vinyl pyrrolidone type polymers. See, for example, Seiderman, U.S. Pat. No. 3,639,524 and Leeds, U.S. Pat. No. 3,621,079.

Despite large amounts of research previously conducted, it is generally agreed that an ideal contact lens has not heretofore been available. This is because of the many stringent requirements of materials suitable for contact lenses. For example, the hydrated material must have sufficient optical clarity and must have structural integrity such that its shape and size do not change over prolonged periods of time under various environmental conditions which would, of course, result in a change in the visual acuity of the wearer.

In addition to these optical properties, suitable materials should have certain other mechanical properties in both the hydrated and anhydrous states. Hydrated materials should be tough, resilient, resistant to compressive and flexural stresses, and should resist tearing and/or nicking. Durability can be further enhanced if the hydrated materials do not become brittle and/or friable upon drying. The anhydrous material should be machinable, such as on a lathe, and readily polishable. It may also be advantageous if the polymerization can be carried out in a mold with or without solvent thereby providing the capability of forming shaped objects without further machining operations.

On the other hand, the hydrated lens material should have a soft texture and feel and the capability to transmit fluid and/or gases. These properties would greatly increase the wearing comfort and allowable wearing time of a contact lens.

SUMMARY OF PREFERRED EMBODIMENTS OF THE INVENTION

A preferred embodiment of the invention relates to the formation of hydrophilic copolymers of N,N-($C_1$-$C_2$ alkyl) acrylamide. These copolymers comprise the reaction product based on 100 parts, of from 20-80 parts of N,N-($C_1$-$C_2$ alkyl) acrylamide, 80-20 parts of $C_1$-$C_4$ alkyl acrylate or methacrylate esters or combinations of both esters, and small amounts of a cross-linking agent such as a multiester of acrylic or methacrylic acid. The copolymerization product is hydrophilic and insoluble in water. It can be equilibrated in an aqueous solution to form a hydrogel material containing large amounts of water.

The polymerization reaction can be carried out in bulk or in solution. Low temperature initiators such as diisopropyl peroxydicarbonate are preferred, although many other initiators can be used.

Hydrogel materials formed from the N,N-($C_1$-$C_2$ alkyl) acrylamide copolymers described herein have significant advantages over hydrogels previously known. One advantage is the outstanding optical characteristics obtainable with these hydrogels. They can be produced to be optically clear, and yet to have the necessary structural integrity to maintain constant visual acuity.

Additionally, the mechanical properties, including nick and tear resistance, compressive strength, elastic recovery, etc. of these hydrogels can be outstanding. Tough hydrogels can be produced which are nevertheless soft in texture. Additionally, the copolymerization products, before equilibration, can be cut, machined, and/or polished using standard techniques with ease. Also, the products can be produced without stress cracks or voids often present in polymerization reaction products. Even when the hydrogels formed from equilibrated N,N-($C_1$-$C_2$ alkyl) acrylamide copolymerization products are subsequently dried, they can have outstanding elasticity, toughness, strength and are not brittle as many of the prior art products.

DESCRIPTION OF THE INVENTION

The hydrophilic, cross-linked copolymer products according to this invention contain at least three ingredients. These are N,N-($C_1$-$C_2$ alkyl) acrylamide, at least one $C_1$-$C_4$ alkyl acrylate or methacrylate, and a cross-linking agent such as a multiester of acrylic or methacrylic acid. In describing this invention, the percentages of these comonomers are given in parts by weight based on a total of 100 parts for the comonomers, unless otherwise specified.

All of the copolymers contain N,N-($C_1$-$C_2$ alkyl) acrylamide in substantial amounts. These acrylamides are unique monomers in that they do not have readily reactable hydrogens, per se. This is also true of their homopolymers. On the other hand, they do form water soluble homopolymers. N,N-($C_1$-$C_2$ alkyl) acrylamides and homopolymers prepared therefrom also offer solubility in an unusually broad range of solvents. When copolymerized with the acrylate or methacrylate esters described herein, however, water insoluble copolymers are formed. N,N-dimethyl acrylamide is the preferred acrylamide monomer because of its ready commercial availability. Suitable copolymers contain about 80–20 parts by weight of N,N-($C_1$-$C_2$ alkyl) acrylamide, and the preferred copolymers of this invention contain about 70–30 parts of N,N-dimethyl acrylamide.

Acrylic or methacrylic acid esters of alcohols containing from 1 to 4 carbon atoms are used as comonomers. These esters are present from about 20 to 80 parts. Preferably, about 10–60 parts of a $C_1$-$C_4$ acrylate and/or about 5 to 60 parts of a $C_1$-$C_4$ methacrylate are used.

The particular acrylate or methacrylate esters used will depend upon the balance of properties wanted in the copolymer or hydrogel product. For example, methyl acrylate or methyl methacrylate usually impart higher tensile and compressive strengths, improved tear and nick resistance, and toughness to hydrogels. On the other hand, butyl acrylates usually contribute better elastic recovery for the hydrogels. A mixture of two or more alkyl acrylate or methacrylates can also be used to achieve a desired balance of properties, including the hydrophobic/hydrophilic balance considered desirable.

Acrylic and/or methacrylic derived multiesters are used as preferred cross-linking agents. The multiester comonomers are present in small amounts, i.e. from about 0.05 to about 4 parts, and preferably 0.5 to 3 parts. Examples of suitable multiesters include glycol dimethacrylates or diacrylates such as: ethylene glycol dimethacrylate or diacrylate, diethylene glycol dimethacrylate or diacrylate, triethylene glycol dimethacrylate or diacrylate, tetraethylene glycol dimethacrylate or diacrylate, polyethylene glycol dimethacrylate or diacrylate, 1,4-butylene glycol and 1,3-butylene glycol dimethacrylate or diacrylate. Other cross-linking agents could be used, of course, in small amounts.

The polymerization reactions are carried out using known initiators, preferably in an oxygen-free atmosphere. To insure uniformity of results, it is important to use carefully controlled polymerization reaction techniques. Reaction exotherms should be controlled to eliminate stress cracking and to obtain optimum conversion of monomers. Reagent impurity levels should be minimized.

The specific temperatures employed for a particular reaction depend upon the initiator, the extrinsic requirements of the reaction system, etc. Low temperature polymerizations, such as those carried out below about 35° C., are preferred because they result in more complete polymerizations, higher molecular weight backbones, and products with lesser amounts of stress cracking.

Representative radical initiators which are suitable include isopropyl peroxydicarbonate, azobisisobutyronitrile, benzoyl peroxide, sodium persulfate alone or combined with sodium sulfoxylate formaldehyde, etc. Lower temperature radical initiators such as isopropyl peroxydicarbonate are preferred because they tend to produce polymerization products with higher molecular weight backbones and with lower reaction exotherm peaks. This is important in forming hydrogel soft contact lenses with an optimum combination of properties. Control and efficient removal of heats of reaction are also important. Small amounts of these initiators, such as 0.01 to 1%, based on the total monomers, are satisfactory.

Additionally, these copolymerizations can be initiated by ultraviolet or high-energy radiation. For example, copolymerization initiated bu UV light is possible. With high-energy particles or electromagnetic rays, it is likely that copolymerization can be initiated at room temperature or at even much lower temperatures. With high-energy radiation, cross-linking will occur even without the addition of multiester cross-linking agents, although the presence of such agents is often preferred, and cross-linked copolymers produced in this manner are certainly within the scope of this invention.

Copolymerization may be carried out by bulk or solution polymerization. When solvents are used, a common water miscible solvent for the comonomers can be chosen which avoids formation of a precipitate when the gel forms thereby avoiding cloudiness in the product, if cloudiness is a problem in the ultimate product. Examples of suitable solvents include water, methanol, ethanol, t-butanol, ethylene glycol and combinations of these or other hydroxylic solvents. Tertiary butanol is a particularly useful solvent, where its use is appropriate, because it does not have a tertiary hydrogen that will chain transfer to limit backbone molecular weight. It appears that a small amount of solvent is often desirable to improve monomer conversion and to flatten the exotherm peak.

The copolymerization product can be removed from its mold and cut into any desired shape. Appropriate polymerization vessels include tubes which produce products in the shape of sticks or casting cells to form sheets. Equilibration with water is accomplished by immersing the bulk polymerization products in water or other aqueous solutions, or by exchanging the solvent used in solution polymerizations with an aqueous solution. Sometimes an appropriate intermediate solvent can be used prior to exchange with water.

Hydrophilic copolymers produced as described herein are particularly suitable for use in hydrogel contact lenses. For this use, copolymers formed from the following monomer composition are preferred:

| | |
|---|---|
| N,N-($C_1$-$C_2$ alkyl) acrylamide | 40–55% |
| $C_1$-$C_4$ alkyl methacrylate | 25–60% |
| $C_1$-$C_4$ alkyl acrylate | 0–25% |
| Cross-linking agent | 0.5–3% |

Two specific compositions which have been found to have outstanding properties for hydrophilic contact lenses are:

| | Wt. % | Wt. % |
|---|---|---|
| N,N-dimethyl acrylamide | 48–49 | 48–49 |
| Methyl methacrylate | 40–50 | 50 |
| $C_1$-$C_4$ acrylate ester | 1–10 | 0 |
| Ethylene glycol dimethacrylate | 1–2 | 1–2. |

Contact lenses prepared from hydrogels wherein the copolymer has the above compositions have been found to exhibit the optical and mechanical properties required for contact lenses and described above. Additionally, it has been found that very thin contact lenses, such as those from about 0.02 to about 0.1 millimeters can be produced which retain these properties and have greater absolute oxygen permeability.

Measurements of compressive stress versus strain and shore durometer hardnesses have been found to be good indicators for many of the mechanical properties required of soft or hydrophilic contact lenses. For example, compressive stress versus strain measurements carried out on cylinders of hydrated polymer provide a good indication of toughness, resilience, nick resistance and ability to resist and recover from compressive and flexural stress such as that encountered in wearing and handling hyrogel contact lenses. An Instron Universal Testing machine with an appropriate load cell can be used for obtaining these values.

Contact lenses can be fabricated directly from nonhydrated polymer in stick form by cutting, lathing and polishing. Indications of durability, strength, lack of brittleness and ease of lathability of the dry polymer can be obtained from compressive stress versus strain measurements made thereon. For example, compressive stress versus strain measurements on dry polymer were conducted on cylinders 0.35 to 0.40 inches thick and 0.45 to 0.65 inches in diameter. Crosshead rates were set at about 20% to 60% of the initial thickness of the samples per minute. Samples showed a modulus before yield of over about 2,000 psi, sometimes over 50,000 psi, and preferably even over about 150,000 psi. Many of these subject compositions were compressed to at least 60% compression relative to the initial thickness without sample failure and with a compressive strength at this percent compression being 20,000 psi or more and in the better cases 40,000 psi or more.

Compressive stress versus strain measurements on hydrated polymer were conducted under water on cylinders 0.4–0.5 inches thick and 0.4–0.7 inches in diameter. The crosshead rate was 20% of the initial thickness of the sample per minute, and compression was carried out by cycling twice between approximately 40% compression and zero compression immediately followed by compression to failure in a third cycle. Compressive strength of the products was over 150 psi, and more desirably over 400 psi, preferably over 600 psi. Percent compression at failure was over 50%, preferably over 60%. The secant modulus at 25% compression in the third compression was over about 450 psi, preferably 120 to about 350 psi. The secant modulus at 40% compression in the third compression cycle was 120 psi to about 700 psi, preferably about 150 to 500 psi. There should be no loss of modulus on cycling three times to about 40% compression. Percent hysteresis within the first and second cycles should be less than about 30%, preferably less than about 20%. There should be essentially no cumulative deformation after the second complete cycle.

For hydrated forms of the copolymer, the Shore 00 durometer values fell in the 65–95 range and preferably in the 70–87 range. The anhydrous form was evaluated using the Shore D durometer and the values obtained were 65 or greater, preferably 75 or over and more preferably 80 or over.

The preferred monomer compositions listed above result in polymers possessing the higher or preferred values under these test conditions.

In the above description, the desirable properties for soft contact lenses of the copolymer and hydrogels formed therefrom have been emphasized. It should be pointed out, however, that this is only one of many uses for the copolymerization product, before or after equilibration, of this invention. Other products which can be formed from the hydrogels include pessaries, semipermeable membranes, dental liners, hydrophilic coatings for hydrophobic substrates, biological implants such as carriers for therapeutic agents, connective tissue, and prosthetic devices, etc. These are only illustrative of the many uses for such hydrogels, and such uses have been adequately disclosed in many prior art publications.

The following examples further illustrate the invention. All parts and percentages are by weight, unless otherwise specified.

EXAMPLE 1

This example describes the copolymerization of N,N-dimethyl acrylamide, butyl acrylate and ethylene glycol dimethacrylate without the presence of solvent and using diisopropyl peroxydicarbonate (IPP) as the reaction initiator. The resulting polymerization product is subsequently equilibrated with water to form a hydrogel. Hypodermic syringe transfer techniques were used throughout and an effort was made to make the reagents and reaction system as free of air as possible as described in the following.

The N,N-dimethyl acrylamide used was obtained from CPC International, Inc. and it was flash distilled under vacuum to remove inhibitor. After purging with argon, it was stored at deep freezer temperatures. The butyl acrylate was obtained from Rohm & Haas Co. and contained 15 ppm methoxy hydroquinone. Ethylene glycol dimethacrylate containing 60 ppm hydroquinone and obtained from Sartomer Resins, Inc. was used.

The reactor was a 10 mm. I.D., 12 mm. O.D. PYREX tube approximately 8 inches long and sealed at one end. A neoprene self-sealing septum was used of the slip-in type with a fold-over rim that was held in place by wiring. Septums were obtained from the Pierce Chemical Co. of Rockford, Ill. The septums were pretreated by soaking in benzene for 15 minutes with agitation followed by two similar treatments with acetone for one hour, and then they were pumped overnight. The reactor was deoxygenated by attaching the tube to a manifold by way of #20 hypodermic needle through the septum. The manifold was arranged so that the tube could be alternately evacuated and vacuum opened with high-purity argon many times.

A stock solution was made up in an 8-ounce carbonated beverage bottle containing 50 wt. % N,N-dimethyl acrylamide, 48 wt. % butyl acrylate and 2 wt. % ethylene glycol dimethacrylate. The bottle was purged slowly with purified argon for approximately 5 minutes and then capped immediately with a perforated crown cap equipped with an extracted self-sealing butadiene-acrylonitrile rubber liner. Diisopropyl peroxydicarbonate in an amount of 0.2% (relative to monomers) was injected into the stock solution bottle. The contents were quickly mixed and pressurized with nitrogen, after which an 8.00 cc. charge was transferred to the reactor using a hypodermic syringe which had been purged with inert gas just prior to the moment of use. Autogenous pressure in the reactor was immediately relieved in a controlled manner and the reactor tube inserted into an unstirred water bath in a 3-liter Dewar flask with an initial water temperature of 26° C. The reactor contents gelled five minutes after the initiator was injected into the stock bottle, but the reactor was allowed to stand in 19°–26° C. water for 47 hours and then another day at room temperature before work up.

The polymerized product was removed from the reactor. It was a crystal clear, colorless, hard, stiff, slightly elastic material. It cut cleanly using either a band saw or a glass cutting wheel.

Slices from the product stick approximately ⅜ inch thick were equilibrated in water by placing them in a jar of distilled water mounted on a mixing wheel and allowed to tumble for approximately one week. The distilled water was changed daily. Water equilibrated material was a very tough, elastic gel containing 27% water. The hydrated product did not fracture when stressed under strong hand pressure. The percent diameter swell after water equilibration relative to the subsequent dehydrated diameter was 12%. Total unreacted monomer was found by a methanol extraction procedure to be approximately 3%. The material was redried and found to be tough, slightly elastic and non-brittle.

EXAMPLE 2

A hydrogel was formed using the monomer composition, initiator concentration, and general techniques of Example 1, but varying some of the reaction conditions as described herein. A room temperature (22°–26° C.) air bath was substituted for the water bath. A gel was noted 5 minutes after introduction of the diisopropyl peroxydicarbonate. After 30 minutes, the gel contained several small bubbles and was cooled down from exotherm. It was left in a room at ambient temperature for 2 days and then removed from the reactor.

The polymer product was clear, colorless, strong and more pliable than the product of Example 1 and had some small bubbles. It could be easily cut using a razor.

After equilibration in water, slices of the product formed a slightly opalescent, very tough but slightly softer gel than the equilibrated product of Example 1. The percent unreacted monomer by methanol extraction was 29%, the percent water content after equilibration was 32%, and the percent diameter swell relative to the dehydrated state was 14%.

EXAMPLE 3

The procedure of Example 1 was used except as noted below. The composition used contained 64% N,N-dimethyl acrylamide, 34% butyl acrylate and 2% ethylene glycol dimethacrylate. A room temperature air bath was used and the reactants gelled 15 minutes after the diisopropyl peroxydicarbonate was added. The reactor walls were hot to the touch after 30 minutes. After 2¼ hours, the reactor was immersed in a water bath at 36°–40° C. and allowed to stand there until the reaction had proceeded for 20½ hours.

The reaction product was a gel which was clear, colorless, fairly strong and included no stress cracks.

After water equilibration, the resultant gel was crystal clear throughout, elastomeric and strong. The estimated percent water content was 59%, and the percent diameter swell relative to the subsequent dehydrated state was 18%. Percent unreacted monomer determined by a methanol extraction procedure was 28%.

EXAMPLE 4

The procedure of Example 1 was used. All the monomers were flash distilled and purged with argon. The tertiary butanol used was a purified grade. The monomers used were 64% N,N-dimethyl acrylamide, 34% butyl acrylate and 2% ethylene glycol dimethacrylate; 20% tertiary butanol relative to the total solution was used as a solvent. A circulating constant temperature water bath was used. 0.050% diisopropyl peroxydicarbonate relative to the total monomers was used initially. After 19 hours in a 25° to 40° C. bath, no reaction was noticeable. The reactor was removed and a second initiator charge consisting of 0.100% isopropyl peroxydicarbonate in three times its volume of methanol was injected. Polymerization was noted in the bath at 28° C. about 15–20 minutes after the second initiator charge was injected. The reactor remained in the bath at 33° C. for a total of 20 hours longer.

The reaction product was a clear, colorless gel with one horizontal crack. The gel was strong and elastic.

After water equilibration, the reaction product was clear, colorless, strong, elastomeric and had good resistance to tear. The estimated water content was 59% and the percent diameter swell relative to the subsequent dehydrated state was estimated to be 24%. Total unreacted monomer was estimated to be 2%. Durometer measurements of the water equilibrated gel with a Shore 00 type durometer (Shore Instrument and Mfg. Co., Jamaica, N.Y.) gave a value of 68.

EXAMPLE 5

The reactor, techniques, monomers, solvent and initiator of Example 4 were used. The procedure was generally the same. The composition used contained 48% N,N-dimethyl acrylamide, 50% butyl acrylate and 2% ethylene glycol dimethacrylate. 20% tertiary butanol, relative to the total solution, was used as a solvent. The temperature and initiator history was similar to Example 4. Initially 0.020% isopropyl peroxydicarbonate was injected. The second initiator injection was the same as in Example 4. Reaction was noticed 15–20 minutes after the second initiator injection. The reaction was allowed to continue for 20 hours in the 33° C. circulating constant temperature water bath. The reaction product was similar in character to that of Example 4.

After water equilibration, the reaction product was clear, colorless, strong, elastomeric and had good resistance to tear. The estimated water content was 30%. The percent diameter swell relative to the subsequent dehydrated state was estimated to be 13–15%. Total unreacted monomer was estimated to be 3½%. The Shore 00 durometer value was 72.

EXAMPLE 6

The reactor and techniques of Example 1 were used. N,N-dimethyl acrylamide and ethylene glycol dimethacrylate were flash distilled under vacuum. Methyl acrylate was used which contained 15 PPM methoxy hydroquinone, and a purified grade of tertiary butanol was used as a solvent. A reaction solution of 20 parts N,N-dimethyl acrylamide, 80 parts methyl acrylate, 0.10 parts ethylene glycol dimethacrylate, 25 parts (based on total monomers) tertiary butanol and 0.5% isopropyl peroxydicarbonate was left in a 30° C. circulating constant temperature water bath overnight. The copolymerization product was a clear gel with no stress cracks but a few voids. Slow equilibration with water resulted in a hydrogel that was tough, elastic and very nick resistant. The product was not completely clear after equilibration in water including a period of boiling. Percent water after equilibration was approximately 28%. Percent diameter increase was approximately 13% relative to the subsequent dry form. Methyl acrylate appeared to impart nick resistance to the hydrogel.

EXAMPLE 7

This and the next five examples were not actually run, but are based on existing data from many actual experiments.

The reagents and procedure of Example 4 are used. A monomer mixture of 64% N,N-dimethyl acrylamide, 24% methyl acrylate, 14% butyl acrylate and 2% ethylene glycol dimethacrylate is used. 25% tertiary butanol is used as a solvent, and 0.2% isopropyl peroxydicarbonate is the initiator. The reactor is placed in a circulating constant temperature water bath at 30° C. until the reaction is completed. It is believed that the resultant hydrogel could be equilibrated in water to produce a clear, tough, nick and tear resistant material.

EXAMPLE 8

The procedure and reagents of Example 7 are used. The initiator is changed to a mixture of 0.2% isopropyl peroxydicarbonate and 0.2% benzoyl peroxide, which are added simultaneously. Polymerization is carried out by immersing the reactor containing the above solution in a 30° C. circulating constant temperature water bath for 20 hours, followed by two hours at 75° C. and one hour at 100° C. It is believed that the resulting hydrogel product could be equilibrated with water to produce a clear, tough, nick and tear resistant material.

EXAMPLE 9

The procedure and reactants of Example 8 are used except that azobisisobutyronitrile is substituted for benzoyl peroxide. It is believed that the results would be similar.

EXAMPLE 10

The procedure and reactants of Example 8 are used except that no isopropyl peroxydicarbonate is used in the initiator. The reaction is irradiated in a room temperature air bath with ultraviolet light from a Hanovia "Utility" mercury lamp for 20 hours.

EXAMPLE 11

The reactants and procedure of Example 7 are used except that no initiator is added and the polymerization is initiated at room temperature using high-energy radiation generated by a Van de Graaff generator in a dosage of 10 megarads in the presence of little or no oxygen. It is believed that the resulting product could be equilibrated with water to produce a useful hydrogel.

EXAMPLE 12

The reactants of Example 7 are used except that the isopropyl peroxydicarbonate is left out and 0.25% benzoin is added. The reactor tube is mounted on the end of a laboratory stirring motor. The tube is rotated at moderate speed in front of a Hanovia "Utility" mercury lamp at room temperature for 24 hours. Polymerization results in material which is believed can be equilibrated to form clear hydrogels.

EXAMPLE 13

The general techniques of Example 1 were used with changes as noted. The reactor used was larger and had an I.D. of 31/32 inches — this is true in all subsequent examples. The composition contained 63% N,N-dimethyl acrylamide, 34% methyl acrylate and 3% ethylene glycol dimethacrylate. After 15 minutes the reactor was immersed in a 47°–50° C. bath where it remained until the reaction had proceeded for 19 hours. A gel was noted in the reactor after 1 hour and 25 minutes. The resultant product was equilibrated in water and produced an optically clear hydrogel with an apparent increase in diameter from that of the initial reaction form of between 55 and 60% and an apparent water content of 79%.

EXAMPLE 14

The polymerization techniques of Example 1 were generally followed using a composition containing 63% N,N-dimethyl acrylamide, 34% ethyl acrylate and 3% ethylene glycol dimethacrylate. Water was used as a solvent in an amount of 25% of the total solution. The reactor was immersed in a 47°–50° C. bath 15 minutes after introduction of the initiator. It remained there until the reaction had proceeded for 19 hours; a gel was noted after 40 minutes.

The reaction product after equilibration in water was a clear hydrogel. The apparent increase in diameter over that of the initial reaction form was 55–60%.

EXAMPLE 15

The compositions and procedures of Example 14 were generally used except that ethylene glycol was used as the solvent. The reaction proceeded exactly as described in the aforementioned example, and the resulting polymerization product was equilibrated with water to produce a clear, soft gel. It had an apparent increase in the diameter from the initial reaction form of about 40–45% and a water content of 58%.

EXAMPLE 16

The composition and procedures of Example 15 were used except that tertiary butanol was substituted as the solvent. The polymerization reaction proceeded as in Example 15. After water equilibration, the hydrogel had an apparent increase in its diameter of 40–45% and could be characterized as a partly clear hydrogel.

EXAMPLE 17

The polymerization techniques were generally the same as those of Example 1. The composition used contained 64% N,N-dimethyl acrylamide, 34% butyl acrylate and 2% ethylene glycol dimethacrylate. Ethylene glycol was used as a solvent and was present in an amount of 25%. Initiation of polymerization occurred at room temperature after 15 minutes; after ½ hour the reactor was immersed in a 47°–50° C. bath and left there until a reaction had proceeded for 19 hours.

The resulting polymeric material, after water equilibration, was a crystal clear, hydrogel. Upon equilibration the apparent increase in diameter was about 15%.

EXAMPLE 18

The general procedures of Example 1 were used with a composition containing 64% N,N-dimethyl acrylamide, 34% methyl acrylate and 1% ethylene glycol dimethacrylate. The solvent used was water and was present in an amount of 25% of the total solution. The initiator used was 0.04% azobisisobutyronitrile. The reactor was immersed in a 65°–68° oil bath and allowed to remain there for 20 hours. A reaction was noted after 1 hour and 35 minutes. The product, after water equilibration, was a crystal clear hydrogel.

EXAMPLE 19

The general procedure and the composition of Example 13 were used substituting sodium persulfate as the initiator in amounts of 0.02%, 0.05% and 0.10%. In all cases, a reaction was noted one hour after injection of the initiator. The products, after water equilibration, were crystal clear hydrogels.

EXAMPLE 20

An attempt was made to set up a reaction system based on 79% N,N-dimethyl acrylamide, 20% butyl acrylate and 1% ethylene glycol dimethacrylate and to contain 25% water relative to the total system. The result was a heterogeneous system. The further addition of an approximately equal amount of glycol still resulted in phase separation. The same monomer composition with 25% glycol alone relative to the total polymerization solution resulted in a homogeneous solution in glycol. Polymerization reaulted in a clear, homogeneous product.

EXAMPLE 21

This example illustrates the use of a redox initiator system. Flash distilled N,N-dimethyl acrylamide was used. Methyl acrylate containing 15 PPM methoxy hydroquinone and the ethylene glycol dimethacrylate containing 60 PPM hydroquinone were used. Sodium persulfate was obtained from City Chemical Corp. and Formopon (sodium formaldehyde sulfoxylate) was obtained from Rohm & Haas Co. The solvent was distilled water. A sodium persulfate stock solution was prepared containing 0.05 gm/cc and a Formopon stock solution was prepared containing 0.035 gm/cc. The reaction solution consisted of 64% N,N-dimethyl acrylamide, 34% methyl acrylate and 1% ethylene glycol dimethacrylate. The water injected was 25% of the total reaction solution. In rapid succession and with good mixing, 0.20% sodium persulfate and 0.14% Formopon were injected. Rapid reaction took place in a room temperature air bath within 13 minutes after the initiator was injected. After one hour, polymerization was completed in a 48°-50° C. oil bath for 20 hours. Equilibration with water resulted in a crystal clear hydrogel.

EXAMPLE 22

The procedure and composition of Example 5 were used except no solvent was present. The reaction product, after water equilibration, was clear, colorless, strong, elastomeric and had good resistance to nick and tear. The estimated water content was 28%. The percent diameter swell relative to the subsequent hydrated state was estimated to be 14-18%. Total unreacted monomer was estimated to be 4%. Durometer measurement on the water equilibrated gel using a Shore 00 type durometer, was 73. Compressive stress versus strain measurement was carried out on water equilibrated hydrogel cylinders under water using a model TTD Instron Universal Testing Instrumant (made by Instron Corp., Canton, Mass.) at a crosshead rate of 20% of the initial thickness per minute. Compressive strength of the 0.410 inch diameter, 0.460 inch thick cylinder at rupture, after two preliminary flexing cycles to 42% compression, was 190 psi at 55½% compression. No cumulative deformation was noted as a result of the flexing cycles and little hysteresis was noted within a flexing cycle indicating a resilient elastomeric material.

EXAMPLE 23

The procedure of Example 4 was used except as follows. No solvent was used. The circulating constant temperature water bath was at 30° C. during the reaction. N,N-dimethylacrylamide, butyl acrylate and ethylene glycol dimethacrylate were in a volume ration of 48/50/2. Each reagent was injected separately using hypodermic syringes, 0.2% isopropyl peroxydicarbonate was injected last. The reaction contents gelled after a few minutes. The tube after 24 hour reaction time contained a clear, colorless, stiff elastomeric material. Durometer measurements on the anhydrous material using Shore 00, A, and D durometers were 88, 43-58, and 10 respectively. The estimated percent water content of the equilibrated gel was 29% and percent diameter swell relative to the subsequent dehydrated state was 14%. Total unreacted monomer was estimated to be 4%. The hydrated product was crystal clear. Shore 00 durometer measurement on the water equilibrated form gave a value of 74.

EXAMPLE 24

The general procedure of Example 1 was used. A glass reactor, 10 mm. ID, 14 inches long, and coated with Teflon spray to serve as a release coating, was employed. A 30°-33° C. circulating constant temperature water bath was used. Monomers N,N-dimethyl acrylamide, butyl acrylate, methyl methacrylate and ethylene glycol dimethacrylate were in the weight percent ratio of 48/25/25/2. These were injected into the air free reactor from an argon purged septum equipped stock bottle. Twenty cc. of 0.2 weight percent isopropyl peroxydicarbonate was then injected, based on the weight of the total monomers in the reactor and a density value of 1.08 gm./ml. for the isopropyl peroxydicarbonate. Gelling was noted in the bath after 20 minutes. Total reaction time was 22 hours. The reaction product was clear, colorless, hard and tough on qualitative examination. The product stick broken out of the reactor was readily cut with a band saw. The hydrated form also appeared clear and tough qualitatively. Total percent unreacted monomer was estimated to be 3½%. The estimated percent water content of the equilibrated gel was 37% and percent diameter swell relative to the redried form was 11%. Shore 00 and A durometer measurements on the hydrated form were 78 and 28 respectively; Shore D measurement on the material as reacted was 74. Compressive stress versus strain measurements using the Instron Machine, on a 0.481 inch thick, 0.436 inch diameter cylinder under water, at a crosshead rate of 28% of the initial thickness per minute after two preliminary flexing cycles to 41.6% compression, gave a compressive strength at rupture of 457 psi at 62% compression. The secant modulus on the third loading cycle at 41.6% compression was 294 psi. The secant modulus, at a given point of the stress-strain cycle, is defined as the compressive stress divided by the percent compression multiplied by 100. No cumulative deformation was noted as a result of the preliminary flexing cycles and essentially no hysteresis was noted within a flexing cycle indicating a resilient, tough elastomeric hydrogel. The ability to lathe the dry form of the polymer into a contact lens shaped surface was demonstrated using a "Hardinge Contact Lens Master" model LM-246 manufactured by Hardinge Brothers, New York, N.Y. The surface was then polished using a Levine and Sons "Lens Surfacer" model ACDS using a proprietary polishing lap and X-Pal 5040 polishing compound made by Grace Chemical Co. in silicone fluid SF 96 made by the General Electric Co.

EXAMPLE 25

This example was carried out following the procedure of Example 24 except that the monomer recipe was N,N-dimethyl acrylamide, methyl methacrylate and ethylene glycol dimethacrylate in a weight ratio of 40/50/2. Gel was noted at 30 minutes in the 30° C. circulating water bath and reaction proceeded for 22 hours. The product was clear and qualitatively similar to the product of Example 23. The total percent unreacted monomer was estimated to be 10%. The estimated percent water content of the equilibrated gel was 44% and percent diameter swell relative to the redried form was 24%. Shore 00 and A durometer measurements on the hydrated form was 84 and 41 respectively. Shore D durometer measurement on the material as reacted was 77. Compressive stress versus strain measurements, using the Instron machine on a 0.512 inch thick, 0.425 inch diameter cylinder under water at crosshead rate of 20% of initial thickness per minute after two preliminary flexing cycles to 40.6% compression, gave compressive strength at rupture of 2470 psi at 71% compression. The secant modulus on the third loading cycle at 40.6% compression was 435 psi. Essentially no deformation was noted as a result of the preliminary flexing cycles and only a moderate amount of hysteresis was noted within a flexing cycle indicating a resilient, tough, elastomeric hydrogel. The ability to lathe and polish the dry form of the polymer was demonstrated as in Example 24.

EXAMPLE 26

The same general procedure as in Example 24 was used except as follows. A 14 mm. ID, 14 inch long reactor coated with Teflon spray was used. Monomers N,N-dimethyl acrylamide, methyl methacrylate and ethylene glycol dimethacrylate were in a weight ratio of 49/50/1. 0.2% isopropyl peroxydicarbonate was injected. The first part of the reaction cycle consisted of 21⅓ hours in the water bath at 25° C. Gelling was noted at 1½ hours. The reactor was then placed into a constant temperature circulating air bath at 45° C. for two hours and then at 70° C. for 2 hours. The coated tube was broken open with the glass separating readily. The product was clear, colorless, hard and tough. The hydrated form was qualitatively elastomeric, tough, and nick resistant. A thick section, i.e., approximately 0.4 inches thick, shows a trace of haze but this is not significant with respect to optical properties for contact lens use at the thickness of interest, i.e., 0.03 to 0.3 millimeters. The ability to lathe and polish the dry form of the polymer was demonstrated as in Example 24. Total percent unreacted monomer was estimated to be less than 2%. The estimated percent water content of the water equilibrated form was 49½% and percent diameter swell relative to the redried form was 17%. Shore 00 and A durometer measurements on the hydrated form were 80 and 30 respectively. Shore D durometer measurement on the initial reacted form was 84. Compressive stress versus strain measurements, using the Instron machine on a 0.475 inch thick 0.625 inch diameter cylinder under water at crosshead rate of 20% of the initial thickness per minute, after two preliminary flexing cycles to 40% compression, gave a compressive strength at rupture of 896 psi at 71% compression. The secant modulus on the third loading cycle at 41% compression was 302 psi. Little cumulative deformation was noted as a result of the preliminary flexing cycles. Approximately 17–20% hysteresis was noted within a flexing cycle. The material is a fairly resilient, tough, elastomeric hydrogel.

Compressive stress versus compressive strain measurements on cylinders of the product in the dry state as prepared, using a crosshead rate of 57%/minute, resulted in a compressive yield strength of $16.8 \times 10^3$ psi at 9% compression and a modulus of $2.2 \times 10^5$ psi before yield. The machine was stopped at 65% compression and a stress of $44 \times 10^3$ psi without fracture of the samples.

EXAMPLE 27

This example was carried out following the procedure of Example 26 except that the monomer weight ratio was 48/50/2. Gelling was noted at 50 minutes. The reaction product in the dry and hydrated states had the same qualitative characteristics as that of Example 26. The ability to lathe and polish the dry form of the polymer was demonstrated as in Example 24. Total percent unreacted monomer was estimated to be less than 1½%. The estimated percent water content of the water equilibrated form was 47% and percent diameter swell relative to the redried form was 14½%. Shore 00 and A durometer measurements on the hydrated form were 82 and 36 respectively. Shore D durometer measurement on the initial reacted form was 85. Compressive stress versus strain measurements, using the Instron Machine, on a 0.490 inch thick 0.650 inch diameter cylinder under water at a crosshead rate of 20% of the initial thickness per minute, after two preliminary flexing cycles to 40% compression, gave a compressive strength at rupture of 859 psi at 64% compression. The secant modulus on the third loading at 40% compression was 449 psi. Essentially no cumulative deformation was noted as a result of the preliminary flexing cycles. Approximately 17% hysteresis was noted within a flexing cycle.

EXAMPLE 28

The example was carried out following the procedure of Example 26 and using the monomer and initiator recipe of Example 27 except that the reaction contained 10% tertiary butanol by volume and the reaction was stopped after the 2 hour period in the 45° C. air oven. Gelling was noted at 1½ hours at 25° C. in the water bath. The product as reacted was clear and had a character qualitatively similar to that of Example 26. The polymer as reacted could be lathed and polished. Total percent unreacted monomer was estimated to be less than 1½%. The estimated percent water content of the water equilibrated form was 56½% and percent diameter swell relative to the redried form was 20%. Shore 00 and A durometer measurements on the hydrated form were 83 and 36 respectively. Shore D durometer measurement in the initial reacted form was 78–80. Compressive stress versus strain measurement using the Instron Machine, on a 0.475 inch thick 0.595 inch diameter cylinder under water, at a crosshead rate 20% of the initial thickness per minute, after two preliminary flexing cycles to 35.7% compression, gave a compressive strength at rupture of 1020 psi at 65% compression. The secant modulus on the third loading cycle at 40% compression was 455 psi. No cumulative deformation was noted as a result of the preliminary flexing cycles. Approximately 17–19% hysteresis was noted within a flexing cycle.

EXAMPLE 29

This example was carried out following the procedure of Example 26 and using N,N-dimethyl acrylamide, butyl acrylate, methyl methacrylate and ethylene glycol dimethacrylate in the weight ratio of 48/25/25/2. The reaction gelled at 50 minutes. The reaction product in the dry and hydrated states had the qualitative characteristics similar to that of Example 26. The ability to lathe and polish the dry form of the polymer was demonstrated as in Example 24. Total percent unreacted monomer was estimated to be less than 1½%. The estimated percent water content of the water equilibrated form was 37% and the percent diameter swell relative to the redried form was 7%. Shore 00 and A durometer measurements on the hydrated form were 73 and 27 respectively. Shore D durometer measurement on the initial reacted form was 80. Compressive stress versus strain measurements carried out as in Example 26 and gave a compressive strength at rupture of 353 psi at 58% compression. The secant modulus on the third loading at 37.3% compression was 286 psi. Essentially no cumulative deformation was noted as a result of the two preliminary flexing cycles. Approximately 2–8% hysteresis was noted within a flexing cycle.

Compressive stress versus compressive strain measurements on cylinders of the product in the dry state, as prepared, using a crosshead rate of 56%/minute resulted in a compressive yield strength of $10.7 \times 10^3$ psi, at 6% compression and a modulus of $2.1 \times 10^5$ psi before yield. The machine was stopped at 64% compression and a stress of $26 \times 10^3$ psi without fracture of the samples.

EXAMPLE 30

This example was carried out following the procedure of Example 26 except for the following changes. The monomers were N,N-dimethyl acrylamide, butyl acrylate, methyl methacrylate and ethylene glycol dimethacrylate in the weight ratio 49/10/40/1. Also 0.20 weight percent benzoyl peroxide was weighed into the reactor before the septum was inserted and the reactor deoxygenated. The reaction also contained 0.2% isopropyl peroxy dicarbonate. The reaction cycle was modified so that at the end there was an additional heating for 2 hours in a 90° C. air oven. Gelling was noted at 1½ hours in the 25° C. water. The reaction product in the dry and hydrated states had the same qualitative characteristics as that of Example 26. The ability to lathe and polish the dry form of the polymer was demonstrated as in Example 24. Total percent unreacted monomer was estimated to be less than 1½%. The estimated percent water content of the water equilibrated form was 47% and percent diameter swell relative to the redried form was 11%. Shore 00 and A durometer measurements on the hydrated form were 73 and 23 respectively. Shore D durometer measurement on the initial reaction form was 82. Compressive stress versus strain measurements carried out as in Example 26 gave a compressive strength at rupture of 631 psi at 72% compression. The secant modulus on the third loading at 39.4% compression was 224 psi. Essentially no cumulative deformation was noted as a result of the two preliminary flexing cycles. 9–10% hysteresis was noted within a flexing cycle.

Compressive stress versus compressive strain measurements on cylinders of the product in the dry state, as prepared, using a crosshead rate of 57%/minute, resulted in a compressive yield strength of $15.1 \times 10^3$ psi, at 8½% compression and a modulus of $2.5 \times 10^5$ psi before yield. The machine was stopped at 64% compression and a stress of $38 \times 10^3$ psi without fracture of the samples.

EXAMPLE 31

This example was carried out following the procedure of Example 26 except for the following changes. The monomers were N,N-dimethyl acrylamide, butyl acrylate and ethylene glycol dimethacrylate in the weight ratio 64/34/2. Also 0.20 weight percent benzoyl peroxide was weighed into the reactor before the septum was inserted and the reactor deoxygenated. The reactor also contained 0.2% isopropyl peroxy dicarbonate. The reaction cycle was modified as in Example 30. Gelling was noted at 15 minutes in the 25° C. water bath. The product was clear and colorless. The ability to lathe and polish the dry form of the polymer was demonstrated. Total percent unreacted monomer was estimated to be 9%. The estimated percent water content of the water equilibrated form was 56½% and percent diameter swell relative to the redried form was 20%. Shore 00 durometer measurement on the hydrated form was 73. Shore D durometer measure on the initial reacted form was 56–62.

EXAMPLE 32

This example was carried out following the procedure of Example 26 except that the monomers were N,N-dimethyl acrylamide, methyl methacrylate and tetraethylene glycol dimethacrylate in a weight ratio of 48/50/2. Gelling was noted at 2¼ hours in the 25° C. water bath. Shore 00 and A durometer measurements on the hydrated form were 80 and 31 respectively. Shore D durometer measured on the initial reacted form was 83. Total percent unreacted was estimated to be 1% or less.

EXAMPLE 33

A hydrophilic copolymer can be formed following the procedure of Example 26 and using a monomer recipe of 48% N,N-diethyl acrylamide, 50% methyl methacrylate and 2% ethylene glycol dimethacrylate. The copolymer formed can be hydrated to form a hydrogel suitable for the uses disclosed herein.

EXAMPLE 34

An attempt was made to form homogeneous solutions of acrylamide, butyl acrylate and ethylene glycol dimethacrylate in the weight ratios 64/34/2 and 48/50/2. In both cases, the acrylamide was found to be insoluble in the other components. This is probably due to the high internal hydrogen bonding of the acrylamide solid.

EXAMPLE 35

An attempt was made to make homogeneous solutions of acrylamide, methyl methacrylate and ethylene glycol dimethacrylate in the weight ratios of 64/34/2 and 48/50/2. The acrylamide was essentially insoluble in the other components, which is probably due to the high internal hydrogen bonding of the acrylamide solid.

EXAMPLE 36

This example was carried out using the monomer and initiator recipes of Example 26, and using the procedure of Example 26 except as noted. The first part of the reaction cycle was carried out in a 22° C. reactor bath and the reactor was 17 millimeters I.D. and 14 inches long. The product was similar in character to that of Example 26, and the ability to lathe and polish the dry form of the polymer was demonstrated as in Example 24. The estimated percent water content of the water equilibrated form was 53% and the percent diameter swell relative to the redried form was 17½%.

What is claimed is:

1. A hydrogel comprising an aqueous solution gelled with a compolymer formed by reacting from about 20 to about 80 weight percent N,N-($C_1$-$C_2$ alkyl) acrylamide with from about 80 to about 20 weight percent of at least one $C_1$-$C_4$ alkyl acrylate or methacrylate and a small amount of a cross-linking agent.

2. A hydrogel of claim 1 wherein said copolymer is formed from about 30 to about 70 weight percent of N,N-dimethyl acrylamide and contains from about 5 to about 60 weight percent of a $C_1$-$C_4$ alkyl methacrylate.

3. A hydrogel of claim 2 wherein said methacrylate comprises methyl methacrylate.

4. A hydrogel of claim 3 which also contains from about 10 to about 60 weight percent of a $C_1$-$C_4$ alkyl acrylate.

5. A hydrogel of claim 4 wherein said acrylate comprises butyl acrylate.

6. A hydrogel of claim 1 in the form of a shaped article.

7. A hydrogel of claim 1 in the form of a contact lens.

8. A hydrogel of claim 3 in the form of a contact lens.

9. A hydrogel of claim 1 wherein said aqueous solution comprises an isotonic solution.

10. A hydrogel of claim 1 wherein said copolymer is formed from about 50 to about 70 weight percent of N,N-dimethyl acrylamide and contains from about 10 to about 60 weight percent of a $C_1$-$C_4$ alkyl acrylate.

11. A hydrogel of claim 10 wherein said $C_1$-$C_4$ alkyl acrylate comprises butyl acrylate.

12. A hydrogel of claim 11 in the form of a contact lens.

13. A compolymer equilibrated with an aqueous solution wherein said copolymer is the reaction product of from about 20 to 80 weight percent N,N-dimethyl acrylamide, from about 80 to about 20 weight percent of a $C_1$-$C_4$ alkyl methacrylate and from about 0.5 to about 3 weight percent of a multiester of acrylic or methacrylic acid.

14. A copolymer of claim 13 wherein said $C_1$-$C_4$ alkyl methacrylate comprises methyl methacrylate.

15. A contact lens comprising an optically clear, hydrophilic, cross-linked copolymer equilibrated with an aqueous solution wherein said copolymer consists essentially of from about 40 to about 55 weight percent N,N-($C_1$-$C_2$ alkyl) acrylamide, from about 25 to about 60 weight percent of at least one $C_1$-$C_4$ alkyl methacrylate, from 0 to about 25 weight percent of at least one $C_1$-$C_4$ alkyl acrylate, and from about 0.5 to about 3 weight percent of a multiester of acrylic or methacrylic acid.

16. A contact lens of claim 15 wherein said aqueous solution comprises an isotonic solution.

17. A contact lens formed from a hydrogel consisting essentially of an aqueous solution and a copolymer formed from about:

| | |
|---|---|
| 48–49% | N,N-dimethyl acrylamide |
| 40–50% | Methyl methacrylate |
| 1–10% | $C_1$-$C_4$ alkyl acrylate |
| 1–2% | Ethylene glycol dimethacrylate. |

18. A contact lens formed from a hydrogel consisting essentially of an aqueous solution and a copolymer formed from about:

| | |
|---|---|
| 48–49% | N,N-dimethyl acrylamide |
| 50% | Methyl methacrylate |
| 1–2% | Ethylene glycol dimethacrylate. |

19. A contact lens formed from a hydrogel comprising an aqueous solution and a hydrophilic copolymer of N,N-dimethyl acrylamide, said contact lens being optically clear and having a thickness of from about 0.02 to about 0.1 millimeters.

20. A contact lens formed from a copolymer of N,N-dimethyl acrylamide, said copolymer having the following physical properties:
  A. in the dry state:
  1. compressive stress-strain values measured on cylinders 0.35–0.40 inches thick and 0.45–0.65 inches in diameter at crosshead rates between 20% and 60% of the initial sample thickness per minute including:
   a. a modulus before yield of over about 150,000 psi;
   b. compressability to at least about 60% relative to the initial sample thickness without sample failure;
   c. compressive strength at 60% compressability of above about 40,000 psi;
  2. a hardness on the Shore D scale of above about 75 durometers.
  B. in the hydrated state:
  1. compressive stress-strain values measured under water on cylinders 0.4–0.5 inches thick and 0.4–0.7 inches in diameter at crosshead rates of 20% of the initial sample thickness per minute including:
   a. a compressive strength after cycling twice to 40% of over about 400 psi;
   b. compressability to at least about 60% relative to the initial sample thickness without sample failure;
   c. a secant modulus at 25% compression in a third compression of between about 120 and 350 psi, and at 40% compression in a third compression between 150 and about 500 psi;
  2. a hardness on the Shore 00 scale from about 70 to about 87 durometers.

21. A process for forming a hydrogel comprising:
  a. forming a reaction mixture consisting essentially of from about 20 to about 80 weight percent N,N-($C_1$-$C_2$ alkyl) acrylamide, from about 80 to about 20 weight percent of at least one $C_1$-$C_4$ acrylate or methacrylate ester, and from about 0.05 to about 4 weight percent of a multiester of acrylic or methacrylic acid;
  b. adding a polymerization initiator to said reaction mixture;

c. maintaining said reaction mixture and initiator at a temperature sufficient to cause copolymerization of said reaction mixture until a cross-linked, hydrophilic, copolymer is obtained which has structural integrity; and, d. equilibrating said copolymer reaction product with an aqueous solution.

22. A process of claim 21 wherein said initiator comprises a low temperature initiator.

23. A process of claim 22 wherein said low temperature initiator comprises diisopropyl peroxydicarbonate.

24. A process of claim 23 wherein said diisopropyl peroxydicarbonate is present in an amount of from about 0.05 to about 0.5 weight percent based on the weight of said comonomers.

25. A process of claim 24 wherein said polymerization is a bulk polymerization.

26. A process of claim 21 wherein said reaction mixture also contains a hydroxylic solvent.

27. A process of claim 26 wherein said solvent consists essentially of tertiary butanol.

28. A process of claim 27 wherein said reaction mixture contains from about 5 to about 60 weight percent of a $C_1$-$C_4$ alkyl methacrylate.

29. A process of claim 28 wherein said $C_1$-$C_4$ alkyl methacrylate comprises methyl methacrylate.

30. A hydrogel prepared according to the process of claim 29.

31. A contact lens formed from the hydrogel of claim 30.

* * * * *